United States Patent
Kanevsky et al.

(10) Patent No.: US 6,295,051 B1
(45) Date of Patent: Sep. 25, 2001

(54) INTELLIGENT BOUNDLESS COMPUTER MOUSE SYSTEM

(75) Inventors: Dimitri Kanevsky, Ossining; Mariusz Sabath, Scarsdale; Alexander Zlatsin, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,483

(22) Filed: Jun. 2, 1999

(51) Int. Cl.$^7$ ............................................. G09G 5/08

(52) U.S. Cl. ................................. 345/163; 348/569

(58) Field of Search ............................. 345/173, 158, 345/157, 175, 145, 156, 339, 340, 341, 329, 331, 332; 348/569, 570, 552

(56) References Cited

U.S. PATENT DOCUMENTS

| | | | |
|---|---|---|---|
| 5,528,263 | * 6/1996 | Platzker et al. | 345/156 |
| 5,706,457 | * 1/1998 | Dwyer et al. | 395/349 |
| 5,832,296 | 11/1998 | Wang et al. . | |
| 5,872,922 | * 2/1999 | Hogan et al. | 395/200 |
| 6,065,057 | * 5/2000 | Rosen et al. | 709/229 |
| 6,094,189 | * 7/2000 | Quillen et al. | 345/158 |
| 6,184,863 | * 2/2001 | Sibert et al. | 345/156 |
| 6,201,484 | * 3/2001 | Russell | 341/20 |

OTHER PUBLICATIONS

"Search and Retrieval in Large Image Archives", by J. Turek, et al., Computer Sciene/Mathematics, RC–20214 (89423) Oct. 2, 1995, pp. 1–18.

MouseREMOTE, by x10 (found at URL http://www.x10.com).

* cited by examiner

Primary Examiner—Bipin Shalwala
Assistant Examiner—Nitin Patel
(74) Attorney, Agent, or Firm—Scully, Scott, Murphy & Presser; Daniel P. Morris, Esq.

(57) ABSTRACT

System and method for controlling of one or more intelligent devices located in proximity with each other at a single location comprises a computer system having screen display terminal including mouse device for providing user-enabled movement of a cursor within a border of the screen display terminal, a detecting system for tracking movement of the cursor and generating a signal indicating when the cursor has reached a border of the screen display terminal; a control system responsive to the signal for tracking further user-enabled movement of the mouse device beyond the screen display border as provided by the mouse device, the control system including: a visual indicator device for providing visual indicator of corresponding cursor movement outside the screen border, and an interactive device for enabling functional operation of an intelligent device pointed to by the visual indicator; the interactive device operating in conjunction with the mouse device for providing activation and functional operation of the other intelligent devices pointed to by the visual indicator.

27 Claims, 7 Drawing Sheets

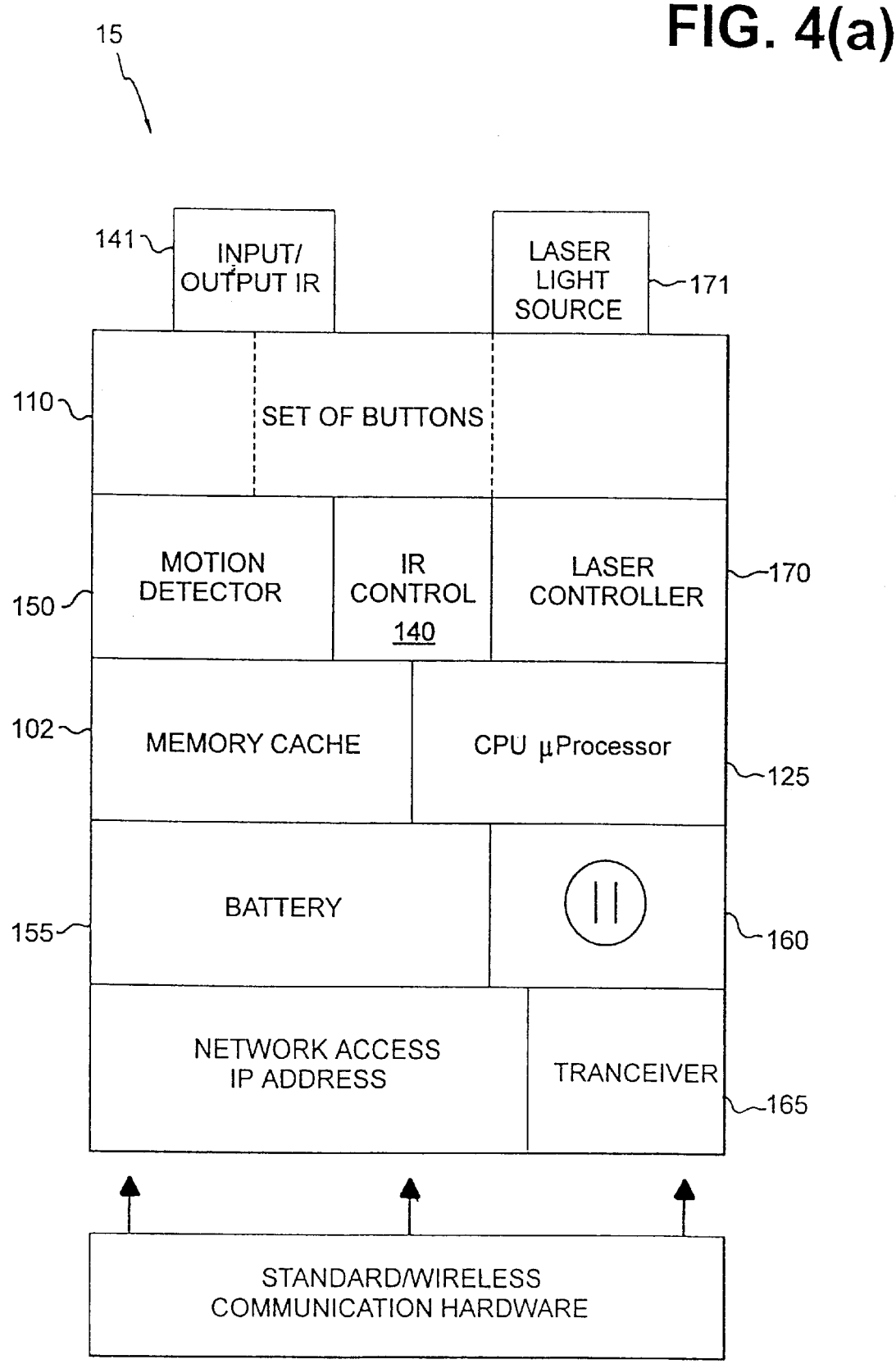

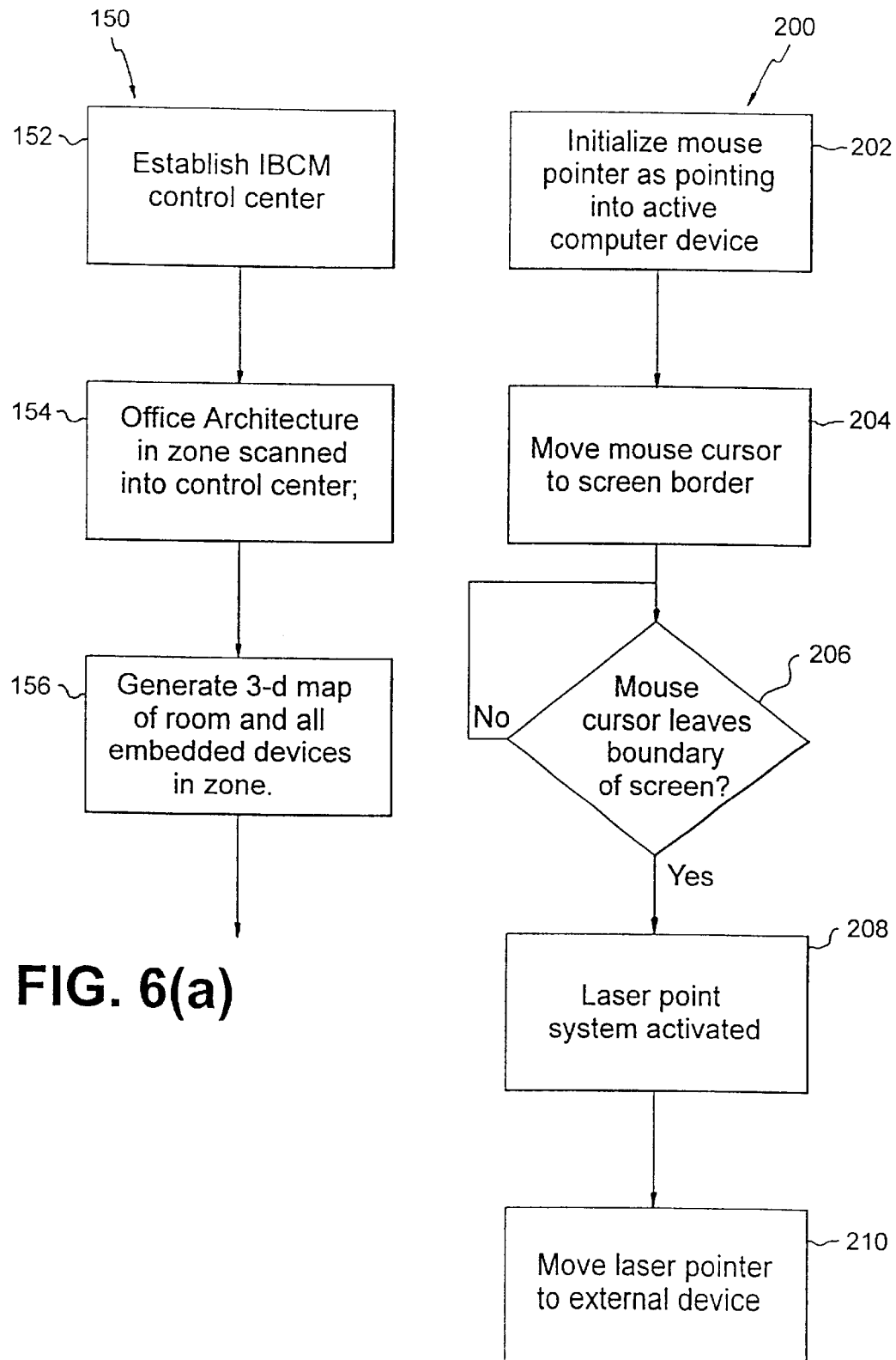

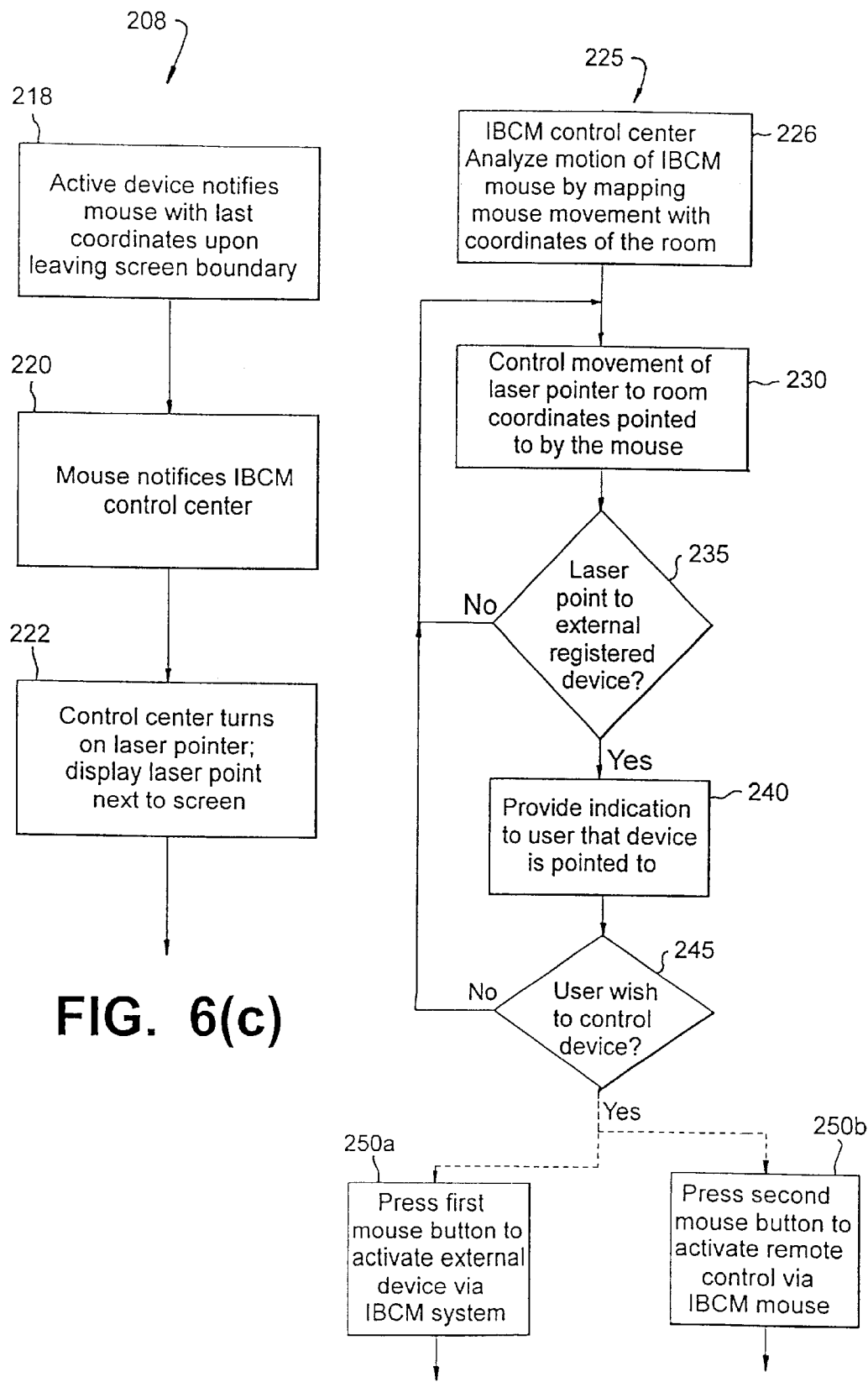

INTELLIGENT BOUNDLESS COMPUTER MOUSE SYSTEM

BACKGROUND OF THE INVENTION

1. Field of the Invention

The present invention relates to mouse devices for computers, workstations, embedded devices and the like, and particularly to a system implementing a novel mouse device for enabling a greater degree of control over several computers/devices.

2. Discussion of the Prior Art

Computer mouse devices employed in personal computers (PCS), workstations, and the like, are limited in the sense that they only are available for controlling events pertaining to a current display on the physical display screen of the monitor connected to the particular computer device. This creates a problem in obtaining data from different peripheral devices not connected to the computer, e.g., calculator, or other computer screens, LCD displays of palmtop computers, tapes, embedded devices etc., due to the fact that such control requires some kind of connection with the target computer: wire, LAN dial-up, IR, RF, etc.

U.S. Pat. No. 5,832,296 describes a user-wearable interface device in the form of a ring, for enabling interaction with a variety of electronic apparatuses, e.g., computers, by a form of wireless transmission, however, does not enable simultaneous control of several computers/devices, nor enable any other type of interaction, such as copying and moving of data to or from the several devices.

A currently available product entitled MouseREMOTE™ by x10 (found at URL http://www.x10.com) is a wireless lmouseff device enabling user control of a PC device and other devices from anywhere in a room. However, the x10 mouse merely communicates with the devices by transmitting pre-defined calls (e.g., using IR or RF) and is incapable of receiving any information. Additionally, every device to be controlled by the x10 device has to have a receiver that is enabled for interpreting such pre-defined calls.

It would be highly desirable to provide a boundless computer mouse control system that is boundless in the sense that it is configured to activate and/or control remote devices, e.g., peripheral devices, when a computer mouse cursor reaches the outside of a screen that is controlled by the mouse.

It would be highly desirable to further provide a boundless mouse device and system implemented for reading information from the screens or memories of other peripheral embedded devices, temporarily storing the read information into a cache memory provided in the mouse device, and pasting it back to a target computer or another embedded device running another process.

SUMMARY OF THE INVENTION

It is an object of the present invention to provide a single intelligent boundless computer mouse ("IBCM") device and control system for a home or office location implemented for activating and/or controlling a plurality of devices having embedded technologies, e.g., peripheral devices, that are registered with the control system at the location.

It is another object of the present invention to provide an IBCM device and control system that provides a visual light tracing of IBCM mouse movements after a cursor on the controlling computer crosses the boundaries of an original computer screen on a computer to which the mouse is connected, the light trace and IBCM facilitating activation and/or control of all devices having embedded technologies.

It is a further object of the present invention to provide the boundless mouse device and system implemented for reading information from the screens or memories of other peripheral embedded devices, temporarily storing the read information into a cache memory provided in the mouse device, and pasting it back to a target computer or another embedded device running another process. For example, selected text from one document may be stored in a memory buffer of the IBCM and then outputted to a printer.

It is yet another object of the present invention to provide an IBCM device and control system as in the previously described objects, that communicates with devices via a network implementing a standard communications protocol, e.g., TCP/IP protocol.

Particularly, the boundless computer mouse device of the invention is provided with circuitry enabling it to be converted to a laser, radio, or infrared remote control once it crosses the boundaries of the computer screen. That is, when the mouse cursor reaches outside of a screen (that is controlled by the mouse), a laser tracking system is activated to provide an initial light spot at the location where the mouse cursor leaves the screen. Alternately, the mouse device itself is provided with circuitry for generating infrared rays (IR) and/or laser light for activating and communicating with a selected device. A control system is additionally activated to enable laser light tracking of further mouse movements providing a visual mouse cursor indication for a user within the confines of the home or office location. Regardless of whether generated from the laser light tracking system or, the mouse device itself, when the light is pointed to some peripheral device registered with the system, that device may be activated and ready to communicate with the main computer device via direct control by the IBCM mouse.

Thus, according to the principles of the invention, there is provided a system for controlling of one or more intelligent devices located in proximity with each other at a single location, the system comprising a computer system having screen display terminal including mouse device for providing user-enabled movement of a cursor within a border of the screen display terminal; a detecting means for tracking movement of the cursor and generating a signal indicating when the cursor has reached a border of the screen display terminal; a control means responsive to the signal for tracking further user-enabled movement of the mouse device beyond the screen display border as provided by the mouse device, the control means including: i) visual indicator device for providing visual indicator of corresponding cursor movement outside the border of the screen display terminal at the location; and, ii) interactive means for enabling functional operation of an intelligent device pointed to by the visual indicator; the interactive means operating in conjunction with the mouse device for providing activation and functional operation of the other intelligent devices pointed to by the visual indicator.

BRIEF DESCRIPTION OF THE DRAWINGS

Further features, aspects and advantages of the apparatus and methods of the present invention will become better understood with regard to the following description, appended claims, and accompanying drawings where:

FIG. 4(a) illustrates a general block diagram of the intelligent boundless computer mouse device according to the invention;

FIGS. 6(a)–6(e) are flow charts depicting operation of the IBCM system of the invention.

DETAILED DESCRIPTION OF THE PREFERRED EMBODIMENTS OF THE INVENTION

The present invention is an Intelligent Boundless Computer Mouse ("IBCM") system for controlling of one or more computers and devices at a single location, using a single mouse device. The mouse device preferable is provided with intelligence for interacting with software controlling the other computers, at the location, and/or other devices/appliances implementing embedded controller technology.

Figure 1:
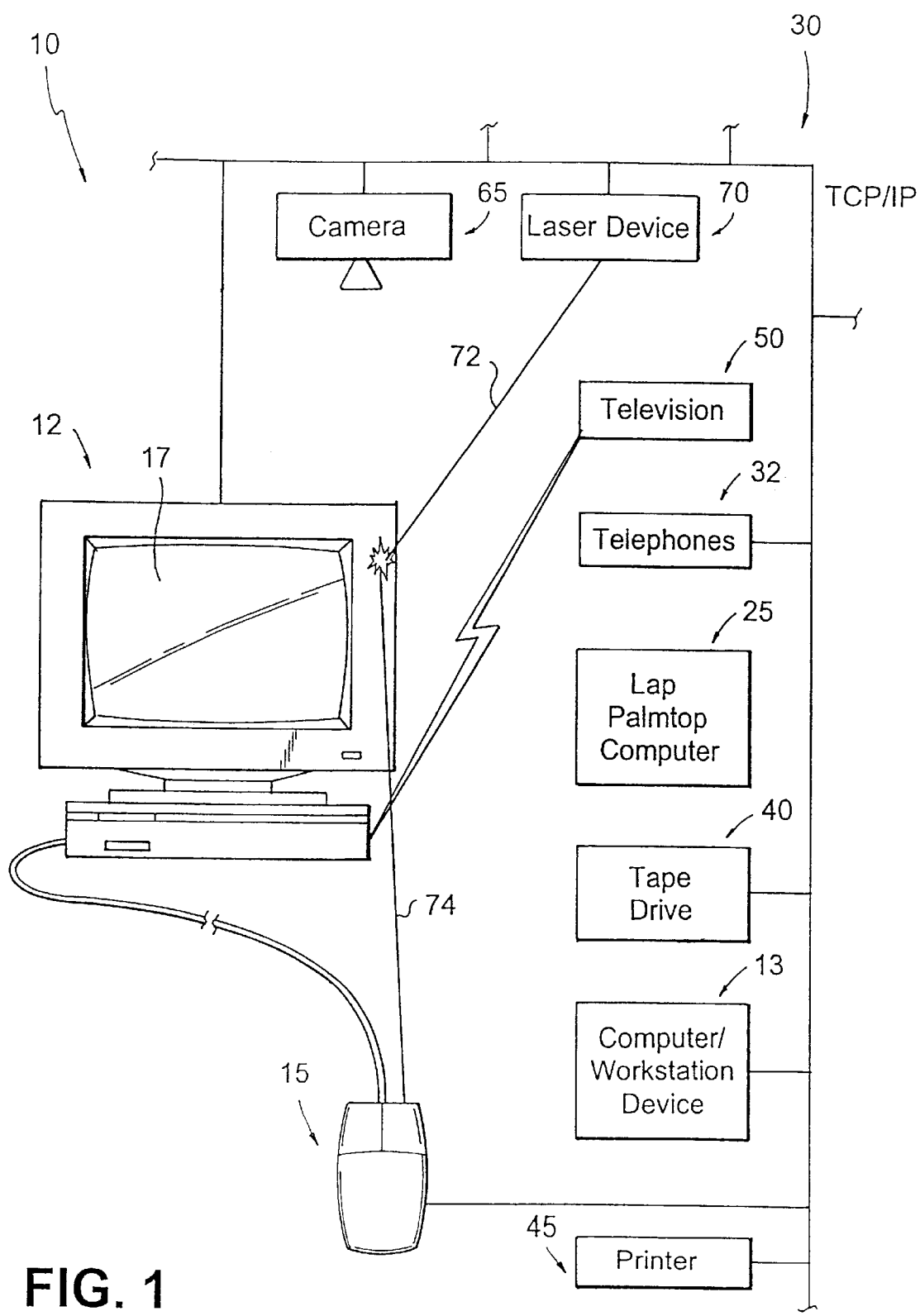
FIG. 1 is an illustration of the intelligent boundless computer mouse (IBCM) system for controlling external devices of the invention.
Figure 2:
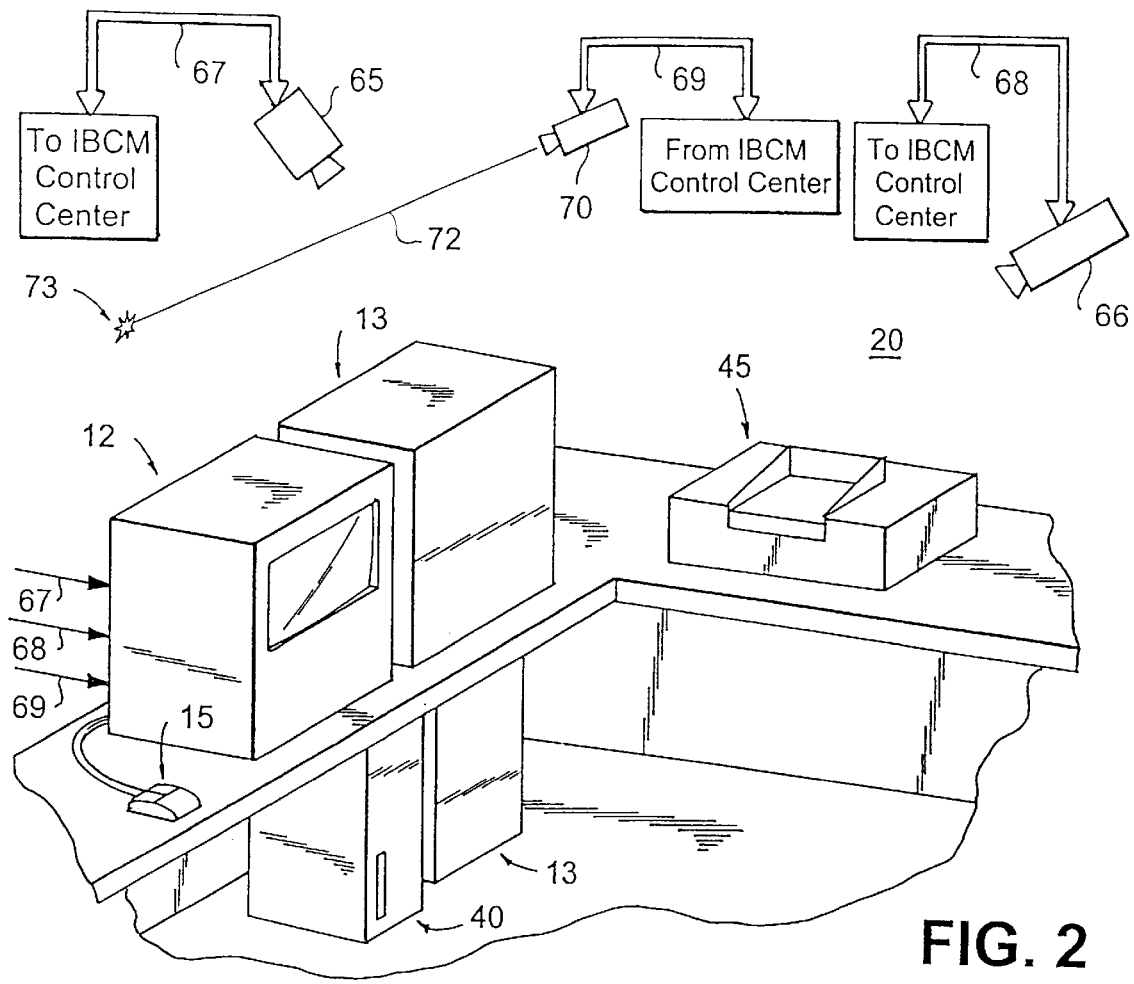
FIG. 2 illustrates the system implementing the boundless mouse device of the invention for controlling external devices at a single location.

The Intelligent Boundless Computer Mouse ("IBCMN") system 10, as shown in FIGS. 1 and 2, comprises an IBCM control center 12 embodied as a single network PC or server device, for example, and executing software for controlling the office/room 20 and the IBCM system and an IBCM mouse device 15. Preferably, the IBCM control center 12 is integrated as part of a larger network 30 comprising interconnected computers/workstation devices 13, in addition to intermediate devices, including but not limited to: telephones 32, tape drives 40, printers 45, etc. As will be described herein, the IBCM control center 12 is capable of controlling other types of household devices/appliances that may be provided in the office/room 20 having embedded controllers, such as lap/palmtop computers 25 having keyboard or pen-based inputs, televisions 50, CD players (not shown), calculators, refrigerators, etc. Each of these devices is registered with the IBCM system 10 and IBCM control center 12. As will be described, in the preferred embodiment, the IBCM device 15 is enabled to move from one device to another for activating other computers and intermediate devices, as desired. Although the IBCM device 15 is shown in FIG. 1 as physically connected to the IBCM control center 12, it is understood that the IBCM device 15 may communicate with the control center 12 via a wireless connection, as will be hereinafter described in greater detail.

In the preferred embodiment, the network 30 may comprise a typical Ethernet or token ring network implementing a standard communications protocol, such as TCP/IP protocol, with each interconnected device, including the IBCM mouse, being assigned a unique IP address. Although FIG. 1 illustrates conventional physical connections between the controlled devices and the network 30, it is understood that communication between the mouse device, the control centers and the embedded devices comprising the network may be accomplished via wireless connections, e.g., as enabled by infrared or RF communication.

Figure 6E:
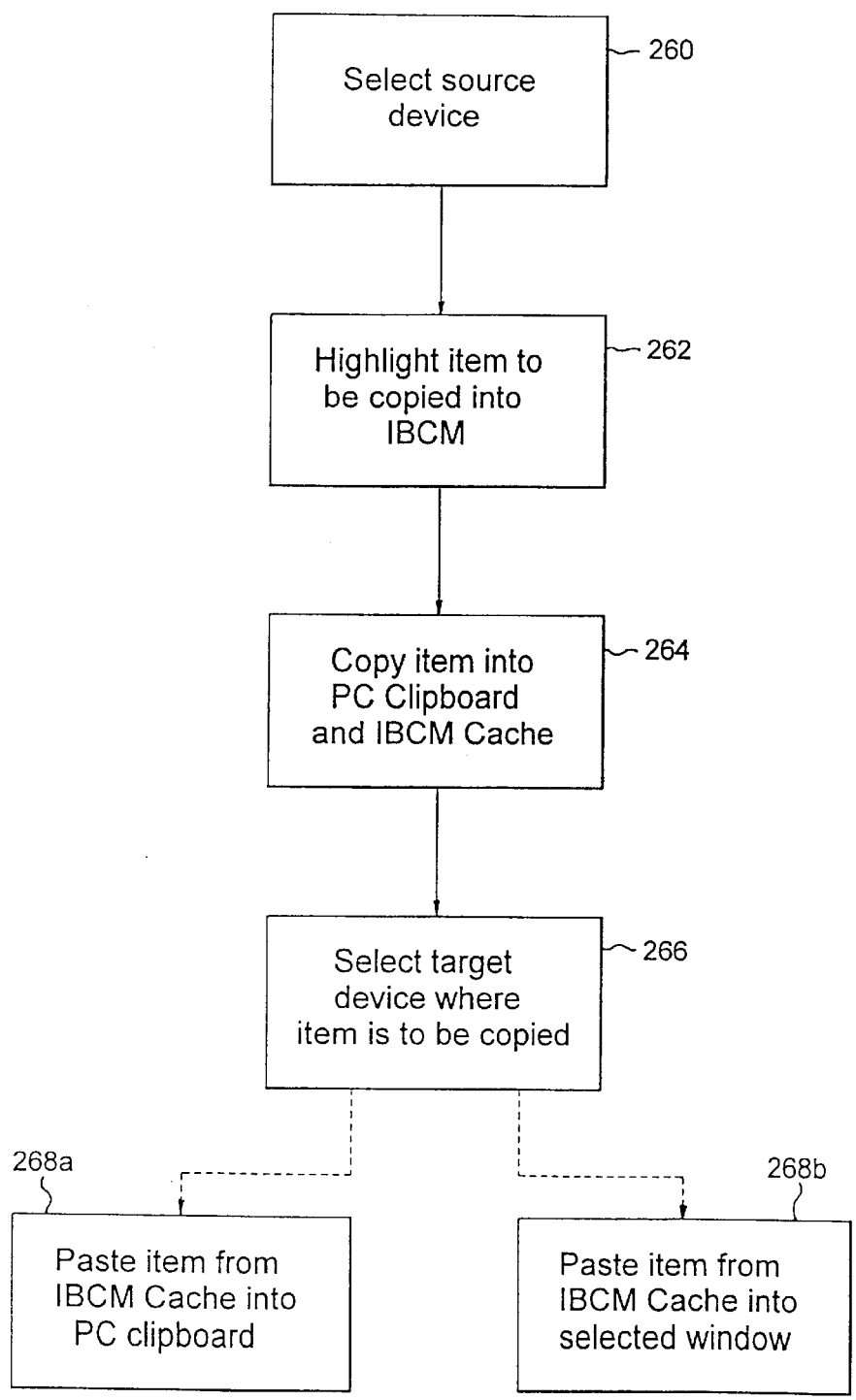

FIG. 6(a) is a flow diagram 150 depicting the initial processes of the ICBM system 10. Initially, the IBCM control center 12 is established at step 152 and the relevant office architecture, i.e., all the controllable intermediate and peripheral devices, are determined and connected, as indicated at step 154. Then at step 156, a 3_dimensional mapping of all of the controllable devices in the room or location 20 is generated. As shown in FIGS. 1 and 2, to generate the 3_dimensional mapping, the system 10 is provided with several camera devices 65, 66 that bi-directionally interface with the IBCM control center 12 over lines 67, 68, respectively, for spanning the room architecture to provide a 3D map of the office/room and all embedded devices for the IBCM control center 12. Particularly, in this manner, the position of every embedded device may be recognized and traced all the time using the set of cameras 65,66. This may be accomplished for example, by use of a visual image tracking system such as described in commonly-owned, copending U.S. patent application Ser. No. 09/238,845 [D# YO9-98-508] entitled "A VIRTUAL MAP SYSTEM AND METHOD FOR TRACKING OBJECTS," the whole contents and disclosure of which is incorporated by reference as if fully set forth herein, or, in a published report by J. Turek, et al., entitled "Search and Retrieval in Large Image Archives", IBM Research Report RC-20214, Oct. 2, 1995, and IBM Journal of Research and Development; Vol. 42, pp. 253–268, March 1998, the contents and disclosure of which is incorporated by reference as if fully set forth herein. Alternately, the embedded devices themselves may generated signals that may be detected by strategically placed sensors, e.g., located on walls in the room, the signals being of strengths that may be measured for determining location of the device. Other types of detection and tracking systems are mentioned in commonly-owned, co-pending U.S. patent application Ser. No. 09/239,939 [D# YO999-042] entitled "METHOD AND APPARATUS FOR EXECUTING NEURAL NETWORK APPLICATIONS ON A NETWORK OF EMBEDDED DEVICES". A low-power light projection system such as a laser device 70 is provided with a bi-directional input 69 from the network IBCM control center 12 for enabling the generation of a light beam 72 and/or visual bright spot 73 for visually tracking movement of the IBCM computer device 15 as it moves 70 when outside the bounds of the computer interface display 17 of the control center computer 12 to which the IBCM mouse device is attached (See FIG. 1). Particularly, any external movement of the mouse pointer is traced by the light beam in the 3-dimensional room 20. Alternately, the tracking light may be generated by the mouse device itself, such as indicated as tracking light 74 in FIG. 1.

Figure 3:
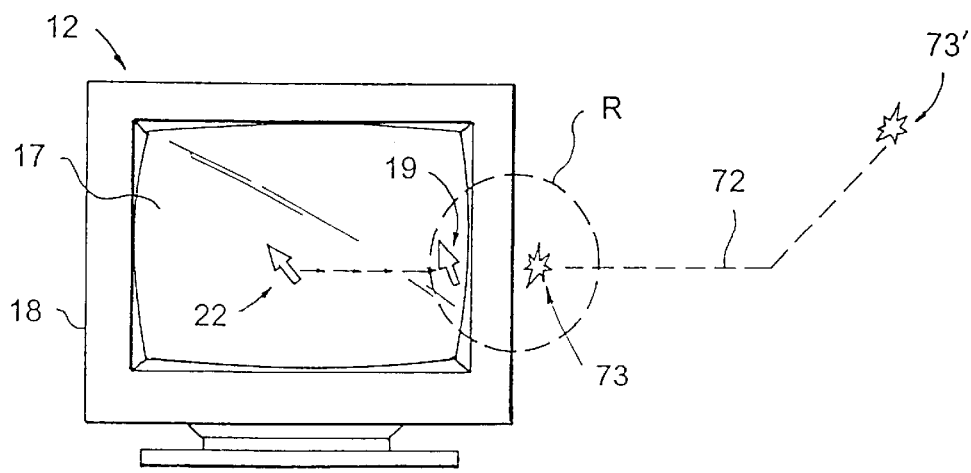
FIG. 3 illustrates the generation and movement of a laser bright spot beyond the bounds of the computer screen terminal.

FIG. 6(b) is a flow chart depicting the general operation 200 of the system after generation of the 3_d mapping. As shown at initial step 202, the IBCM mouse cursor is displayed as pointing into the GUI of computer monitor or display associated with the current active computer (e.g., IBCM control center). This is shown in FIG. 3, where the IBCM mouse cursor 22 is displayed as pointing into the GUI 17 of computer monitor or display 18 associated with the current active computer (e.g., IBCM control center 12). Preferably, the IBCM mouse 15 continuously notifies the Control Center 12 what machine it is active on.

Referring back to FIG. 6(b), the next steps 204, 206 indicate the conventional movement of the mouse cursor within the GUI/screen borders with an additional determination being made (at step 206) as to whether the mouse cursor has moved toward the screen border of the active computer display GUI 17. Once the mouse cursor has moved to the screen border, the laser point system is activated at step 208, with the laser pointer itself being moved under mouse device control to any external device in the room, as indicated at step 210.

FIG. 3 and the flow chart of FIG. 6(c) illustrates the laser point system activation system of step 208 (FIG. 6(b)) in greater detail. As shown in FIG. 3, when the mouse cursor 22 is at a location corresponding to the boundary 19 of the display screen, software on the machine communicates with the IBCM mouse 15 to provide it with the last known coordinates of the boundary location where the cursor leaves the screen. This is indicated at step 218 in FIG. 6(c). Particularly, software activates a communication module (transmitter or conventional network connection) in the PC and sends data to the communication module which transmits this data into the IBCM. Thus, the mouse is using wireless connection to access the Control Center and notify its motion when the mouse "attaches" itself to a device, and if there is a direct connection to this device via infrared or wireless, it will use this device as a bridge into the Control Center. If this "attached" device does not have wire-less capabilities, the mouse uses its wire-less connection to the Control Center from which conventional connection into the device may be established. It is assumed that any device that can be accessed by IBCM has to have some network or external access capability. In response, the IBCM mouse 15 notifies the Control Center 12, e.g., by sending signals, e.g., radio, direct link, infrared rays, etc., to the control center for processing as indicated at step 220 (FIG. 6(c)) which, in turn, activates the laser pointer system 70 (FIG. 2) for displaying the light spot 73 next to the machine that was active, i.e., next to the boundary location where the mouse cursor left the screen (as indicated at step 222 of FIG. 6(c)). As shown in FIG. 3, there is indicated an approximate range "R" where the laser pointer bright spot 73 will be displayed.

The IBCM system 10 now analyzes subsequent IBCM mouse device motion imparted to it by the user. FIG. 6(d) is a flow chart depicting IBCM Mouse control operation 225. As shown at step 226, the IBCM Control Center 12 analyzes motion of the IBCM mouse device and maps mouse tracking ball movement, for instance, with the coordinates of the room. Then, at step 230 (FIG. 6(d)), the IBCM Control Center 12 communicates control signals to the laser pointer for tracking all subsequent mouse motion, e.g., from position 73 to a new position 73', as shown in FIG. 3. This is done while simultaneously tracking the coordinates of the pointer in the 3-D mapped room. Next, at step 235, a determination is made as to whether the laser pointer is pointing to an external registered device. In the preferred embodiment, when the mouse pointer and corresponding laser light spot 73 contacts another device in the office/room 20, the Control Center 12 initiates activation of the software on this device via network communications which may comprise hardwire cord connections 132, wireless communication, radio signals, infra-red signals 130, etc. That is, the software of the selected device is started to run and follows some communication protocol between this device, the IBCM and the Control Center. The activation mechanism may put some software and data into RAM of this device to speed it up, etc. This is because the Control Center 12 knows the device location and performs computations for mapping the device location with the mouse pointer location. The software of the new device then becomes "active" and visually (or audibly) notifies the user, for example, by providing flashes on the display of the new active device, or emanating sound, etc., as indicated at step 240 (FIG. 6(d)). Then, at step 245, the user determines if the external device pointed to by laser pointer is to be controlled. If the user accepts the chosen device, it acknowledge the choice to the device either by clicking a first mouse button, e.g., button 110a on the IBCM mouse (FIG. 1) for activating the chosen external device from via the IBCM control center, as indicated at step 250a, or, by clicking the second mouse button, e.g., button 110b on the IBCM mouse device, for activating the chosen external device from via the IBCM mouse itself, as indicated at step 250b. In either embodiment, the IBCM system 12 binds with the local software of the local device, e.g., via the wired or wireless connection to the device. Subsequently, internal functions of the newly activated device may be controlled and/or activated by pressing mouse buttons on the IBCM mouse device 15, and moving the mouse, as in the conventional manner.

It should be understood that the user may implement the IBCM device 15 to move from one intermediate device to another in the office/room 12 and activate one or more of the devices for contemporaneous control thereof. When the IBCM mouse is in the boundary of a device it activates the IBCM software "active machine" and becomes "bound" to the local software. That is, when a user accepts a device to be active, software on this device will "attach" the IBCM into the local system with the IBCM replacing and/or supressing other control devices (e.g., local mouse in case of the desktop computer, control key pad in case of the printer, etc.)

At this moment, the IBCM mouse 15 becomes a standard mouse for the activated machine and overrides the local mouse attached to the activated machine (assuming the activated device is a computer device).

That is, the IBCM system software adapts to local software on the active machine, and, preferably, it may be implemented as a platform independent device, such as enabled by Java™ provided by Sun Microsystems, Inc.. Accordingly, the invention enables the IBCM mouse to copy bytes, text, files into its memory buffer and then, in the manner described herein, move to another intermediate device, e.g., computer, and paste the stored data or print the selected text on an active printer, for example.

FIG. 4(a) is a block diagram depicting the major functional components of the IBCM mouse device 15. As shown in FIG. 4(a), the IBCM mouse device 15 includes one or more mouse buttons 110; a input/output infrared light control device 140 including an output 141 for the IR rays; a laser light control device 170 including an output 171 for laser tracking light; a motion detector 150; a CPU 125 and memory cache 102; and, a battery power supply 155. One additional component including a speaker device 160 is provided to communicate to a user a detected error or processing delay. That is, the IBCM mouse 15 generates a predefined sound to describe its work. For example, when the IBCM mouse attaches itself to the device, the device acknowledges back to the user that it was chosen and correctly enabled, e.g., either by flashing the display or generating a sound. If the device does not have a way of communicating back, e.g., a microwave oven, the IBCM mouse will do it instead. Thus, as an example: the laser (from the laser tracking or from the mouse) points into the laptop computer; the computer is recognized by the recognition system and the Control Center 12 searches its database to find an IP address of the device; upon detection of the correct device, connection is established between the IBCM mouse 15 and the device; and the mouse generates a suitable confirmation sound/message via speaker 160. Optionally, a message may be audibly communicated to tell the user the host name of the chosen device. As further shown in FIG. 4(a), a transceiver device 165 is provided that enables wireless communication with standard communications hardware provided with the IBCM control center 12. It is understood that the IBCM mouse device 15 is assigned its own network IP address to enable communication with the control center and the devices. It should be understood that the IBCM mouse device may establish communication through multiple media: remote access, modem, and ethernet. All standard ways of communication are done via the standard TCP/IP protocol.

Figure 4B:
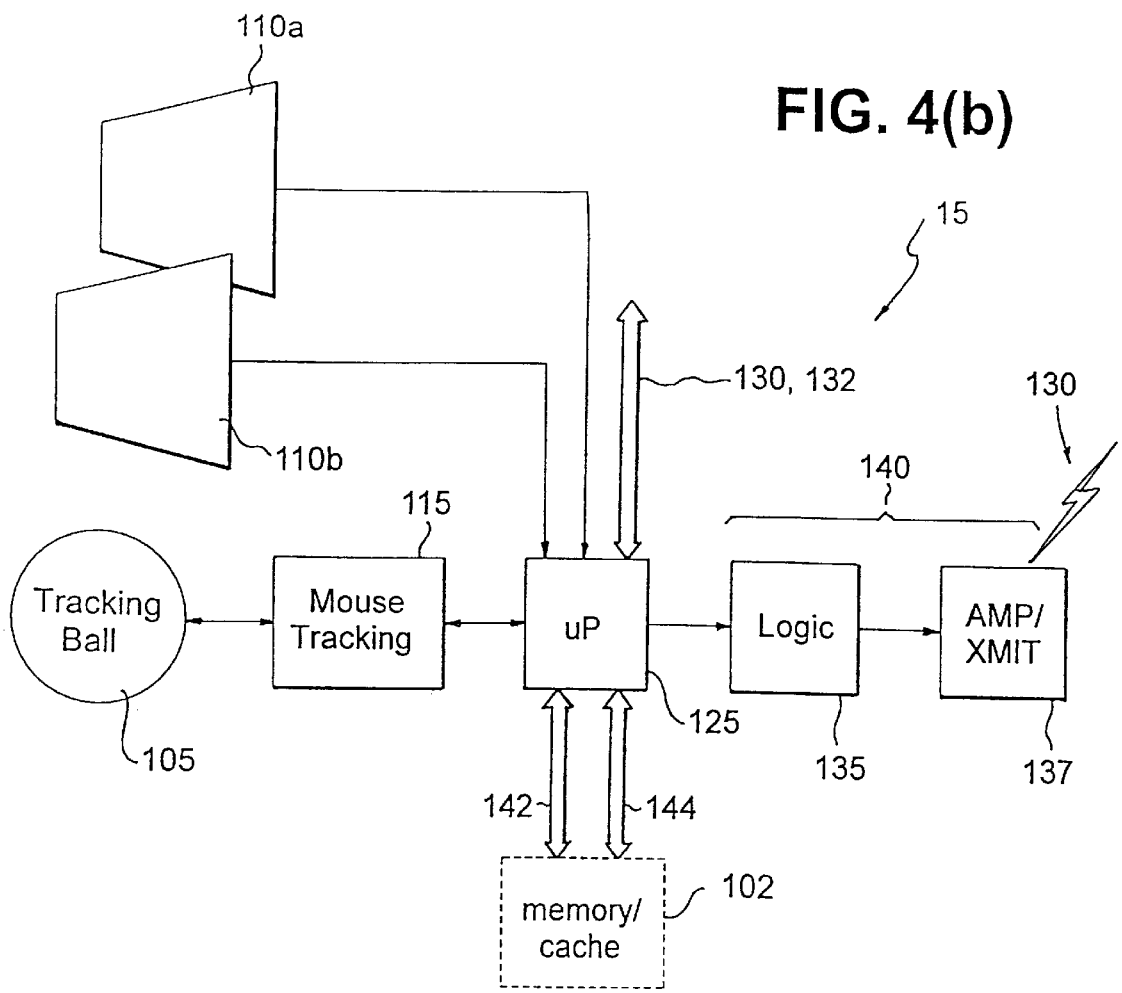
FIG. 4(b) illustrates a detailed block diagram of the intelligent boundless computer mouse device according to the invention.
Figure 5:
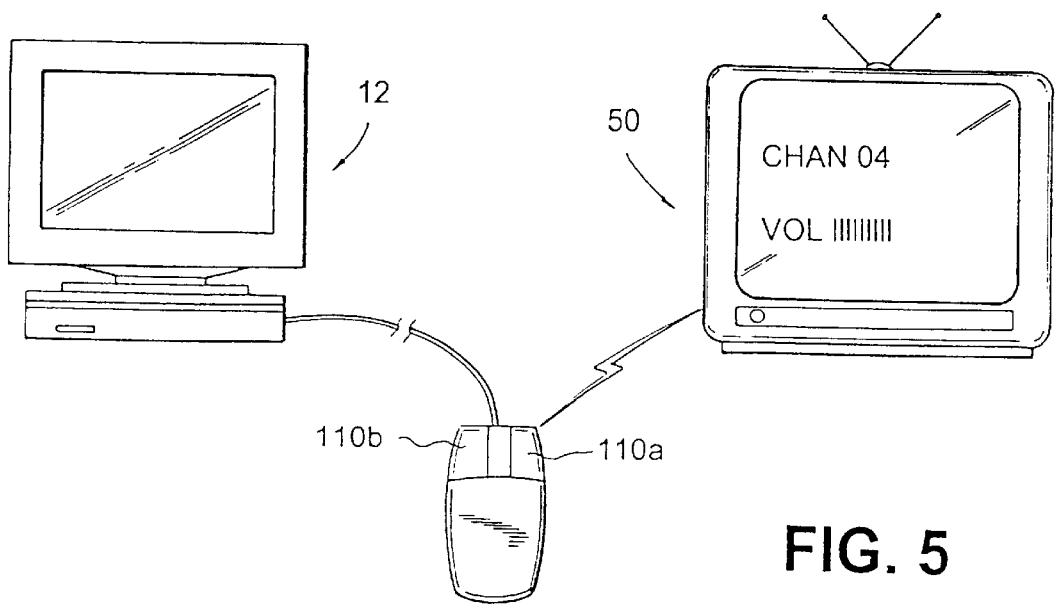
FIG. 5 illustrates the control of an external device via the intelligent boundless computer mouse device according to the invention.

As shown in further detail in FIG. 4(b), the IBCM mouse device 15 includes a standard mouse tracking ball 105, for example, and one or more mouse buttons 110a,b. The mouse tracking ball 105 interfaces with a mouse tracking logic component 115 for converting IBCM cursor position tracking signals from the tracking ball to control signals suitable for input to microprocessor 125. Each of the mouse buttons 110a,b additionally provides control signals for input to microprocessor 125. The micro-processor device 125 itself provides IBCM control signals 130 for input to the IBCM control center 12, e.g., via a hardwire connection 132, or alternately, may generate IBCM control signals 130 for direct input to the IBCM control center 12, or, directly to other devices in the system, e.g., via logic driver 135 and infra-red wireless transmitter device 137 of IR control unit 140. Thus, for example, remote control of the external device, e.g., television 50 via mouse buttons may be provided, such as illustrated in FIG. 5 for functioning as a wireless television remote control device for enabling typical controls of television 50. Thus, one of the two mouse control buttons 110a,b, may perform a select function with one button, e.g., button 110a, used to scroll up a control function, and one button, e.g., button 110b, used to scroll down a control function.

Preferably, the cache/memory 102 of the IBCM mouse device is used by the micro-processor device 125 and interfaces with the micro-processor device 125 via data, address and control lines 142, 144. The microprocessor device 125 interfaces directly with cache/memory storage device 102 to enable control of several computers/devices and interaction with the controlled devices software. Provision of this cache memory enables the intelligent mouse device 15 to copy, store and convert data, and, additionally transport data between different devices, e.g., from one computer to another computer, printer or palm pilot, etc. Thus, as shown in the process flow diagram of FIG. 6(e), at step 260, the user first selects a source device, e.g., a networked PC, from which the item, including text and images, may be copied. Then, at step 262, the item to be copied into the IBCM device is highlighted. Next, at step 264, implementing the IBCM control system software and manipulating the IBCM mouse 15, the item (text, image) is copied into the PC clipboard of the selected device and the IBCM cache memory. The target device to which the copied item is to be copied, is then selected at step 266 in the manner described herein. Then, two steps may be performed for pasting the item into the target device. At step 268a, the copied item may be pasted from the IBCM cache memory into the PC (system) clipboard for subsequent pasting to a displayed window of a running application using the standard system (paste) operation. Alternately, as indicated at step 268b, the copied item may be pasted from the IBCM cache memory directly into the selected window of the running application in the target device.

It should be understood that if the selected device is not on network, the IBCM cache memory may be used to receive device code, e.g., drive software, capable of activating and controlling the specific device non-networked device, e.g., a television. This cached code is used to generate an IR signal in the IBCM mouse that matches the selected non-networked device enabling the device to react.

The device type will be recognized by following procedures: the camera device (FIGS. 1 and 2) captures the image of the selected device and sends it to the IBCM Control Center where its database is queried for the recognition of the device. The matching device may be determined, for example, according to the techniques as disclosed in abovementioned report by J. Turek, et al., entitled "Search and Retrieval in Large Image Archives," IBM Research Report RC-20214. Then, the desired software code is loaded into the IBCM mouse cache memory. The system then enables appropriate control signals (according to the cached software) to be sent to the device directly from the IBCM mouse without network connection. Thus, according to a preferred embodiment of the invention, the IBCM mouse device may be dynamically loaded with device drive software (stored in the IBCM control center database, for instance) which may change according to the different applications and devices that are to be controlled by the IBCM mouse device. This is in contrast to prior art wireless mouse devices which are typically pre-loaded with pre-set software for controlling predetermined number of devices.

The present invention is capable of running on any general purpose computer system or computer controlled GUI (e.g., a television or virtual reality system), including GUIs that have the ability to present multimedia and/or virtual reality information. Although not shown, the IBCM computer system 10 includes typical computer components including a central processing unit (CPU), memory storage device, one or more monitors or graphical interfaces, and the IBCM mouse device. In one embodiment, the computer system may comprise a IBM RISC SYSTEM/6000. The mouse device 15 may be used to select GUI objects or icons from the screen. On an IBM RISC System/6000, multiple monitors may be controlled by multiple monitor adaptor cards (not shown) such as the IBM RISC System/6000 Color Graphics Display Adaptor.

The CPU may be connected via a network adaptor (not shown) to connect the IBCM system 10 to a network. Network adaptors are well known and may include, for example, token ring adaptors, ethernet adaptors, and modems. The system 10 may be connected to other target monitors through a client/server network (or LAN add number).

While the invention has been particularly shown and described with respect to illustrative and preformed embodiments thereof, it will be understood by those skilled in the art that the foregoing and other changes in form and detail may be made therein without departing from the spirit and scope of the invention which should be limited only by the scope of the appended claims.

Having thus described our invention, what we claim as new, and desire to secure the Letters Patent is:

1. System for controlling of one or more intelligent devices located in proximity with each other at a single location, said system comprising:

computer system having screen display terminal including mouse device for providing user-enabled movement of a cursor within a border of said screen display terminal, detecting means for tracking movement of said cursor and generating a signal indicating when said cursor has reached a border of said screen display terminal;

control means responsive to said signal for tracking further user-enabled movement of said mouse device beyond said screen display border as provided by said mouse device, said control means including:

visual indicator device for providing visual indicator of corresponding cursor movement outside said border of said screen display terminal at said location;

interactive means for enabling functional operation of an intelligent device pointed to by said visual indicator;

said interactive means operating in conjunction with said mouse device for providing activation and functional operation of said other intelligent devices pointed to by said visual indicator.

2. The system as claimed in claim 1, wherein said control means further comprises means for mapping location of each said proximate one or more intelligent devices at said location.

3. The system as claimed in claim 2, wherein said mapping means includes one or more camera devices for scanning said location and obtaining locations of said intelligent devices.

4. The system as claimed in claim 2, wherein said interactive means for enabling functional operation of an intelligent device pointed to by said visual indicator, further includes means for generating a graphic on said screen display terminal representative of internal operational functions that may be enabled via said mouse device.

5. The system as claimed in claim 2, wherein said visual indicator device includes a laser pointer, said visual indicator appearing as a bright spot produced by said laser pointer.

6. The system as claimed in claim 2, wherein said interactive means further includes means for enabling one or more computer systems to interact with said intelligent devices when they are accessed by said mouse device.

7. The system as claimed in claim 6, wherein each said intelligent device includes embedded processor technology, said devices selected from one or more from the group comprising: a computer device, a palmtop computer, tape drive, calculator, refrigerator, telephone, a laptop computer, VCR, and television.

8. The system as claimed in claim 7, further comprising a network means connected to and communicating with one or more said intelligent devices in accordance with a communications protocol.

9. The system as claimed in claim 8, wherein a communication with said network means is accomplished by a media selected from the group comprising: physical bus line connections, wireless communication, radio signals and infra-red signals.

10. The system as claimed in claim 9, further including means for transferring data between said intelligent devices and one or more computers via said mouse device, said transferring means including means for copying items from an application running in a first selected intelligent device, storing said items in a memory storage device, and pasting said items to an application running in a selected second intelligent device, wherein said items includes text or images.

11. The system as claimed in claim 10, wherein said mouse device initiates copying of said items from a selected device, said mouse device including memory storage means for temporarily storing said copied data.

12. The system as claimed in claim 11, further including means for dynamically configuring said mouse device with software for controlling selected intelligent devices, said software being stored in said memory storage means.

13. The system as claimed in claim 8, wherein said network comprises an Internet, said communications protocol including TCP/IP with each said intelligent device and said mouse device having an associated Internet Protocol address for enabling communication therebetween.

14. The system as claimed in claim 8, wherein said intelligent device includes a computer system having a second mouse device associated therewith, said system for controlling operation of said second mouse device via said first mouse device.

15. The system as claimed in claim 8, further including means for enabling control via said mouse device of a cursor displayed on screens of other intelligent devices in said system.

16. A method for controlling of one or more intelligent devices located in proximity with each other and defining a single location, said method comprising:

a) providing user-enabled movement of a cursor within a border of a screen display terminal;

b) tracking movement of said cursor on said screen display terminal and detecting when said cursor has reached a border thereof;

c) upon detection of cursor movement at said screen border, activating mouse tracking system including generating a visual indicator near said location corresponding to location of said cursor beyond said screen display border as provided by said mouse device, said mouse tracking system tracking subsequent user enabled movement of said mouse device with corresponding movement of said visual indicator at said single location; and, e) enabling activation and functional operation of said intelligent device pointed to by said visual indicator.

17. The method as claimed in claim 16, wherein said enabling step e) further comprises the step of prompting user action when said visual indicator points to and intersects an intelligent device located at said single location.

18. The method as claimed in claim 16, further including the step of mapping locations of each said proximate one or more intelligent devices at said location.

19. The method as claimed in claim 16, wherein said mapping step includes the step of providing one or more camera devices for scanning said location and obtaining locations of said intelligent devices.

20. The method as claimed in claim 17, wherein said prompting step further includes the step of generating a graphic display on said screen display terminal representative of internal operational functions that may be enabled for said selected external device via said mouse device.

21. The method as claimed in claim 17, wherein said step of generating a visual indicator includes activating a laser pointer device for generating a visual bright spot at said location.

22. The method as claimed in claim 17, further including the step of enabling one or more computer systems to interact with said intelligent devices when they are accessed by said mouse device.

23. The method as claimed in claim 17, wherein each said intelligent device includes embedded processor technology, said devices selected from one or more from the group comprising: a computer device, a palmtop computer, tape drive, calculator, refrigerator, telephone, a laptop computer, a VCR, and a television.

24. The method as claimed in claim 17, wherein said mouse tracking system comprises a network means enabling communication between said mouse device and a selected intelligent device according to a communications protocol.

25. The method as claimed in claim 23, wherein communication with said network means is accomplished by one or more selected from the group comprising: physical bus line connections, wireless communication, radio signals, and infra-red rays.

26. The method as claimed in claim 16, further including the step of transferring data between said intelligent devices and one or more computers, said transferring step including steps of: copying items from an application running in a first selected intelligent device, storing said items in a memory storage device, and pasting said items to an application running in a selected second intelligent device, wherein said items includes text or images.

27. The system as claimed in claim 26, further including the step of dynamically configuring said mouse device with software for controlling selected intelligent devices, said software being stored in a memory storage means provided in said mouse device.

\* \* \* \* \*